United States Patent

[11] 3,542,080

[72] Inventors William H. Tomb;
Peter E. Wesel, and Anthony R. Zine, Jr.,
Corning, New York
[21] Appl. No. 763,467
[22] Filed Aug. 5, 1968
Division of Ser No. 612,659, Jan. 30, 1967,
now Pat. No. 3,419,291.
[45] Patented Nov. 24, 1970
[73] Assignee Corning Glass Works
Corning, New York
a corporation of New York

[54] PIPE COUPLING COMPONENT
3 Claims, 8 Drawing Figs.
[52] U.S. Cl. .................................................. 138/143,
156/84
[51] Int. Cl. ................................................... F16l 9/14
[50] Field of Search ....................................... 138/143,
109; 156/86, 84

[56] References Cited
UNITED STATES PATENTS
2,703,774 3/1955 Morrison ...................... 156/84
3,206,344 9/1965 Elkins .......................... 156/86
3,376,055 4/1968 Donroe ........................ 285/236

Primary Examiner—Laverne D. Geiger
Assistant Examiner—R. J. Sher
Attorneys—Clarence R. Patty, Jr. and William D. Fosdick ABSTRACT: A pipe coupling in which an annular beadlike adaptor member is held around the end of an unbeaded cylindrical section of glass pipe by means of a metal band bonded to the outer surface of the pipe and interlocking with the adaptor member. The metal band is bonded to the glass by a composite adhesive medium which includes circumferentially oriented glass fibers and a heat-shrinkable material and axially oriented glass fibers. A second metal band maintains a flexible gasket around the adaptor member.

Patented Nov. 24, 1970  3,542,080

INVENTORS
WILLIAM H. TOMB
PETER E. WESEL
ANTHONY R. ZINE, Jr.
BY William D. Fosdick
AGENT

3,542,080

PIPE COUPLING COMPONENT

CROSS-REFERENCE TO RELATED APPLICATION

This application is a division of my copending application Ser. No. 612,659, filed on Jan. 30, 1967, issued as U.S. Pat. No. 3,419,291 on Dec. 31, 1968.

BACKGROUND OF THE INVENTION

The field to which this invention pertains is that of pipe couplings in fluid handling systems, and more particularly couplings having utility in joining unbeaded, cylindrical sections of glass pipe.

A common means for joining beaded sections of glass pipe is a coupling of the type described in Canadian Pat. No. 691,860. In that coupling, a metal band having inwardly tapered edge portions bears upon a resilient annular gasket, which is bent by the band around the beaded ends of the joined pipe section and urges them toward one another to form a seal with an inwardly projecting rib on the gasket. Such coupling is not satisfactory for use with unbeaded pipe sections. Inasmuch as it is often inconvenient to form beads on glass pipe, particularly when the pipe is cut at the site of installation, it is advantageous to have a coupling capable of joining cylindrical pipe ends.

SUMMARY OF THE INVENTION

According to the invention, a coupling having utility in joining unbeaded pipe sections includes a discrete beadlike adaptor member which is placed around the end of an unbeaded pipe section and which is held in place by an annular metal band which is bonded to the outer surface of the glass. Between the glass and the band is a composite adhesive medium. The adhesive medium includes a layer having a multitude of glass fiber portions extending in a circumferential direction with respect to the band, a heat-shrinkable layer and a layer of glass fibers oriented so as to have a component in an axial direction with respect to the band. The heat-shrinkable layer is laminated between the layer having the circumferentially oriented glass fibers and the layer having the axially oriented glass fibers. When the heat-shrinkable material is elevated in temperature it shrinks in an axial direction with respect to the pipe, causing the circumferentially oriented fibers to become stacked in the area of the center of the space between the band and the glass, thereby increasing the radial thickness of the layer of circumferentially oriented glass fibers, while decreasing the axial extent thereof. The result is that these stacked glass fibers tightly press outer adhesive layers of the adhesive composite medium against the inner surface of the metal band and the outer surface of the glass in order to provide intimate contact between the adhesive layers and the surfaces to which bonding is to be effected. The layer of axially oriented glass fibers is resistant to contraction in the axial direction, thereby maintaining the original axial extent of contact between the composite medium and the glass pipe.

DESCRIPTION OF THE PREFERRED EMBODIMENTS

Figure 1:
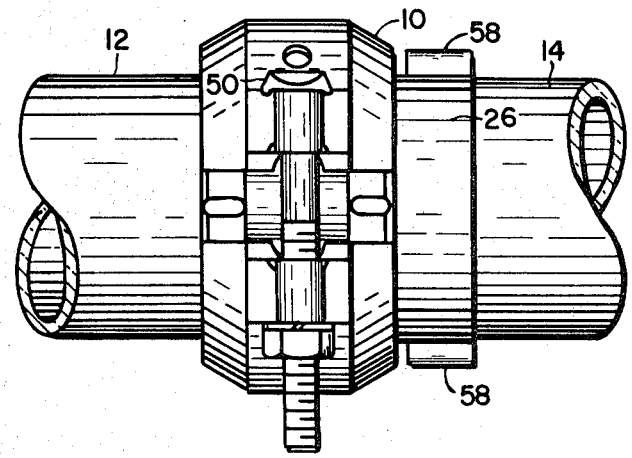
FIG. 1 is a side elevational view of two sections of glass pipe joined by a coupling according to the invention.
Figure 2:
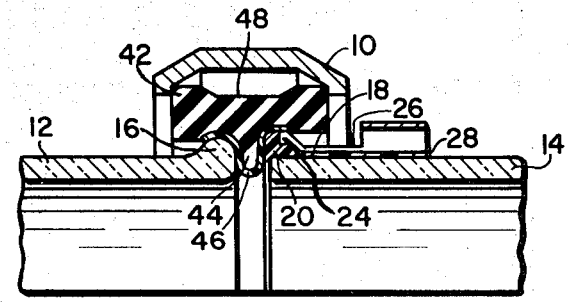
FIG. 2 is an axial sectional view through the coupling of FIG. 1 prior to the tightening thereof.
Figure 7:
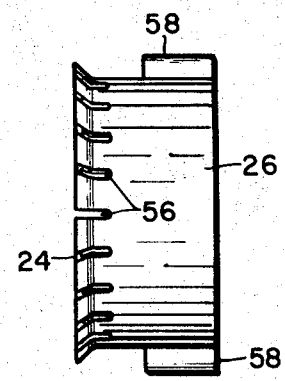
FIG. 7 is a side view of the band used to hold the adaptor member in place.
Figure 3:
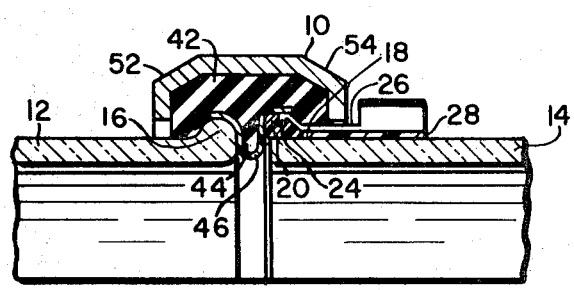
FIG. 3 is a view similar to that of FIG. 2 showing the coupling subsequent to tightening.

Referring in particular to FIGS. 1—3 of the drawing, the coupling of the invention comprises a clamping band 10 which surrounds the coupled ends of glass pipe sections 12 and 14. Pipe section 12 is provided with a bead 16 at its end, while pipe section 14 has a plain, cylindrical end 18. In order to adapt end 18 to the coupling and to provide a fluid-tight seal, an annular bead adaptor member 20 surrounds end 18 with its inner surface in contact with the outer surface of the glass pipe. Adaptor member 20 comprises a corrosion-resistant material, such as polytetrafluoroethylene. Bead adaptor member 20 is provided with an annular groove into which fits a tongue portion 24 of stainless steel adaptor member retaining band 26. Adaptor member retaining band 26 is, in turn, bonded to the outer surface of pipe section 14 by means of the composite adhesive medium illustrated in FIGS. 4 and 5.

Figure 4:
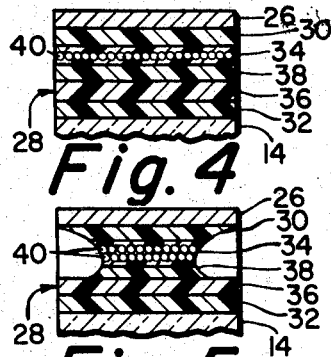
FIG. 4 is an enlarged sectional view illustrating the composite adhesive medium utilized in the coupling.
Figure 5:
FIG. 5 is a view of the composite adhesive medium of FIG. 4 subsequent to the heating thereof.
Figure 8:
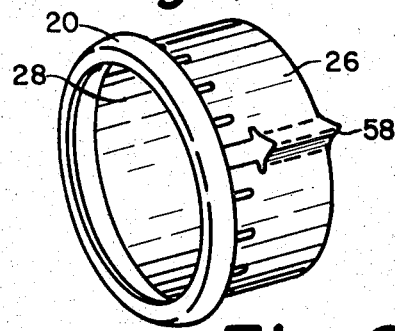
FIG. 8 is a perspective view of a component of the coupling at an intermediate stage of assembly of the coupling.

Referring to FIGS. 4 and 5, composite adhesive medium 28 initially comprises five discrete layers. Each of the outer layers 30 and 32 comprises a modified acrylic copolymer resin which is capable of being softened and rendered adhesive by the action of heat and the simultaneous absorption of a plasticizer, such as diallyl phthalate. Layer 34 comprises a heat-softenable resin impregnated with a multitude of glass fibers. The glass fibers are oriented such that each fiber extends in a circumferential direction around the pipe end. Layer 36 comprises a standard fiber glass cloth, wherein glass fibers are contained in a plastic matrix. Some of the fibers in this layer are oriented so as to have a component extending in an axial direction with respect to the pipe. Each of layers 34 and 36 contains diallyl phthalate as a plasticizing agent for migration to layers 30 and 32. Layer 38 comprises a heat-shrinkable plastic material. The five layers are pressed tightly together and caused to adhere to the inner surface of band 26, prior to assembly of the coupling, as illustrated in FIG. 8.

As shown in FIG. 4, glass fibers 40 initially are spread out in an axial direction with respect to pipe section 14. After band 26 with the adhesive medium adhered to its inner surface is placed around the ends of pipe section 14, heat is applied to the interior of the pipe section by means of a heating coil. The assembly is heated to approximately 450°F. When the assembly reaches approximately 200°F., heat-shrinkable layer 38 contracts in an axial direction with respect to the pipe. Adherence between layers 34 and 38 causes layer 34 to contract in the same manner, thus tending to stack the glass fibers near the center of the coupling, as illustrated in FIG. 5. The effect of the stacking of the fibers is to increase the radial thickness of the composite adhesive medium, thereby forming a tight fit between the adhesive medium and the inner surface of band 26 and the outer surface of pipe 14. When the temperature of the adhesive medium reaches 450°F., the resins become plastic and cure into a single integral structure.

Layers 30 and 32 may be formed as follows: 1200 grams of OR-250 Unithane White, obtainable from American Cyanamid Company are mixed with 1824 grams of Polytex 913, obtainable from Celanese Corporation, and 416 grams of Solvesso 100, obtainable from Stoney-Mueller, Inc. The resultant mixture is ball milled approximately 16 hours, after which 352 grams of Polylink 980, obtainable from Celanese Corporation, 224 grams of Solvesso 100, 48 grams of butyl alcohol, 40 grams of Z-6040 Silane, obtainable from Dow-Corning Corporation, and 72 grams of 2- Octanol are added to the mixture and the resultant mixture is ball milled for 2 hours. The resultant product is then painted on silicone-treated paper to a thickness of approximately 1 mil and the coated paper is warmed to approximately 140°F. to dry the mixture. The coating can then be removed from the paper for utilization in the adhesive medium of the pipe coupling.

Layer 34 may comprise parallel fibers of glass Owens-Corning type 893 with polyester compatible sizing, impregnated with a mixture of catalized diallyl phthalate and a diallyl phthalate prepolymer, such as Dapon, available from Ford Machinery Corporation. Each fiber may extend around the pipe through 360°, or more numerous shorter fibers may be used. Alternatively, a single helical fiber may form a plurality of revolutions about the pipe.

Layer 36 may comprise Owens-Corning No. 181 fiber glass cloth, bolan treated, impregnated with diallyl phthalate. Since come of the fibers in this layer are oriented so as to have a component extending in an axial direction with respect to the pipe, the layer is resistant to contraction in the axial direction thereby maintaining the original axial extent of contact between the composite medium and the glass pipe, as illustrated in FIG. 5. Alternatively, layer 36 may be fiber glass cloth with the glass fibers oriented unidirectionally parallel to the axis of the pipe.

Heat-shrinkable layer 38 may comprise Dupont No. 65 HS Mylar*.

Rubber gasket 42 surrounds bead 16 and bead adaptor 20 and has an annular inwardly projecting rib 44 located between the pipe ends. Rib 44 is covered by a corrosion-resistant liner 46 formed of polytetrafluoroethylene. Gasket 42 is provided with an external annular channel 48 to facilitate bending of the gasket around the bead adapter.

When clamping band 10 is tightened about the pipe ends by means of bolt 50 to the position illustrated in FIG. 3, the inner surfaces of its inwardly tapered edge portions 52 and 54 bear against the edges of the gasket to bend the gasket around bead 16 and bead adapter 20, thereby pressing both the bead and the bead adapter against gasket rib liner 46 to form fluid-tight seals therewith. At the same time, the bead adapter is pressed tightly against the outer surface of pipe end 18 to form a fluid-tight seal between the inner surface of the bead adapter and the outer surface of the pipe.

The coupling of the invention is assembled by first pressing adapter retaining band 26 into interlocking relationship with the bead adapter Due to the fact that the tongue portion of the band is provided with a plurality of serrations 56, it is able to expand radially to permit access to the groove in the bead adapter After the band and the bead adapter have been locked together, adhesive medium 28 is pressed against the inner surface of the band. Due to the tendency of the layers of the adhesive medium to adhere to one another and to the inner surface of the band, the component comprising band 26, bead adapter member 20 and composite adhesive medium 28 may be retained as an integral unit until it is subsequently bonded to a piece of pipe. Such bonding is effected by placing the component over the ends of the pipe, drawing the band 26 tightly around the surface of the pipe by pinching ear portions 58 manually by means of pliers, and subsequently heating the assembly to approximately 450°F. to seal the composite adhesive medium to band 26 and pipe section 14 and to cure the polymers contained therein. Bead adaptor 20 may be initially stretched over a rigid disk to maintain it in an expanded state facilitating its placement over the pipe. The disk is removed immediately prior to assembly of the component in a coupling, at which time the bead adaptor begins to shrink to its original diameter.

Figure 6:
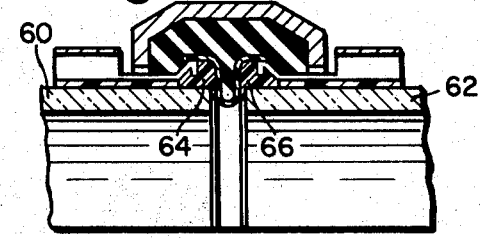
FIG. 6 is a view similar to that of FIG. 3 illustrating a modified coupling according to the invention.

The coupling of the invention may be utilized to join a beaded section of glass pipe to an unbeaded section of pipe, or to join two unbeaded sections. The latter arrangement is illustrated in FIG. 6, wherein cylindrical pipe sections 60 and 62 are joined by means of bead adaptors 64 and 66.

Inasmuch as further variations may be made within the scope of the invention, it is intended that the scope of the invention be limited only by the scope of the appended claims.

We claim:

1. A pipe coupling component comprising:
   a. A generally cylindrical retaining band;
   b. An annular beadlike adaptor member attached to said retaining band in the vicinity of one edge thereof; and
   c. A composite adhesive medium in proximity with the inner surface of said retaining band, said medium including a plurality of discrete annular layers comprising:
      c1. a first annular layer of material in proximity with the inner surface of said retaining band, said first layer having at least one lay of a fiber comprising a plurality of generally parallel portions, with each of said portions extending circumferentially with respect to said retaining band and being embedded in a thermoplastic matrix; and
      c2. a second annular layer of material adjacent to said first annular layer on the side thereof opposite said retaining band, said second layer shrinking at least in an axial direction, with respect to said retaining band, when heated.

2. A component according to claim 1 including, adjacent to said second layer on the side thereof opposite said first layer, a third layer of material having a lay of fibers embedded in a thermoplastic matrix, with at least a portion of said fibers being oriented so as to have a component extending in an axial direction with respect to said retaining band, thereby resisting contraction of said third layer in said axial direction.

3. A component according to claim 2, wherein said fiber portions of said first and third layers comprise glass fibers.